United States Patent
Lenoble

[11] Patent Number: 6,165,968
[45] Date of Patent: Dec. 26, 2000

[54] PARTICULATE FOAM CONTROL AGENTS

[75] Inventor: Bertrand Lenoble, Hellebecq, Belgium

[73] Assignee: Dow Corning S. A., Seneffe, Belgium

[21] Appl. No.: 09/421,664

[22] Filed: Oct. 20, 1999

[30] Foreign Application Priority Data

Oct. 24, 1998 [GB] United Kingdom ............ 9823259

[51] Int. Cl.⁷ .................. C11D 3/02; C11D 3/20; C11D 1/66; C11D 3/37

[52] U.S. Cl. ............. 510/466; 510/441; 510/349; 510/358; 510/361; 510/377; 510/507; 510/515; 516/117

[58] Field of Search ................... 510/441, 466, 510/349, 358, 361, 377, 507, 515

[56] References Cited

U.S. PATENT DOCUMENTS

| | | | |
|---|---|---|---|
| 3,829,386 | 8/1974 | Wegst et al. | 252/135 |
| 5,589,449 | 12/1996 | Kolaitis et al. | 510/466 |
| 5,767,053 | 6/1998 | Germain et al. | 510/349 |
| 5,861,368 | 1/1999 | Kolaitis et al. | 510/466 |
| 6,004,918 | 12/1999 | Adams | 510/353 |

FOREIGN PATENT DOCUMENTS

| | | | |
|---|---|---|---|
| 0013028A1 | 7/1980 | European Pat. Off. | C11D 3/08 |
| 0192442A2 | 8/1986 | European Pat. Off. | C11D 3/20 |
| 329842 | 8/1989 | European Pat. Off. | C11D 3/12 |
| 0578424A2 | 1/1994 | European Pat. Off. | C11D 3/37 |
| 0636684A2 | 2/1995 | European Pat. Off. | C11D 3/12 |
| 0718018A2 | 6/1996 | European Pat. Off. | B01D 19/04 |
| 0723795 | 7/1996 | European Pat. Off. | |
| 0995473 | 7/1996 | European Pat. Off. | |
| 0831145A2 | 3/1998 | European Pat. Off. | C11D 3/37 |
| 0997180 | 5/2000 | European Pat. Off. | |

*Primary Examiner*—Kery Fries
*Attorney, Agent, or Firm*—Timothy J. Troy

[57] ABSTRACT

This invention relates to a particulate foam control agent comprising from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate-type binder or encapsulant, whereby the polycarboxylate-type binder has a pH of 3 or less when dissolved in water. The invention also relates to a detergent composition comprising the particulate foam control agent and a method for the preparation of the foam control agent.

11 Claims, No Drawings

PARTICULATE FOAM CONTROL AGENTS

This invention relates to particulate foam control agents, more particularly those intended for incorporation in detergent compositions which are in powder form.

Particulate foam control agents based on silicone antifoams are well known from the art and have been described in many patent specifications. Also, powder detergent compositions comprising silicone based foam control agents are well known.

Particulate foam control agents often contain a carrier material for the foam control agent to make the foam control agent into a more substantial solid particulate material and facilitate its handling. The particulate foam control agent can then be post-blended as a powder with the rest of the powder detergent composition.

Materials that have been suggested as carrier materials for particulate silicone based foam control agents include water soluble, water insoluble and water dispersible materials. Examples of suggested carrier materials are sulphates, carbonates, phosphates, polyphosphates, silicas, silicates, clays, starches, cellulosic materials and aluminosilicates. The use of a carrier material adds a component to the final composition of the powder detergent. If the carrier material is not itself a component which contributes to the efficiency or activity of the powder detergent, it will in effect constitute an additional soil which has to be removed during the laundering process. It is thus desirable to use as carrier material, materials that are standard components in powder detergents.

Many patent specifications describe problems of diminishing foam control ability of silicone based foam control agents, when stored in powder detergents for prolonged periods of time. Solutions to overcome the storage problem have been suggested and include the use of a variety of materials as encapsulating or protective materials, intended e.g. to coat or bind the silicone antifoam. The theory is that encapsulation or binding counteracts the unwanted spreading of silicone oil used in the preparation of the silicone antifoam onto the surrounding detergent powder. This spreading results in the reduction of the concentration of one of the most important ingredients of the foam control agents and, in extreme cases, depleting the foam control agent of the silicone oil altogether, thus deactivating the foam control agent. Often, the encapsulating or protective materials are used in combination with the carrier material.

A foam control agent comprising an encapsulating or protective material is known from EP-A-0.636.684. The foam control agent disclosed in EP-A-0.636.684 comprises from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate-type binder or encapsulant. Even where the concentration of the silicone antifoam in the foam control agent is rather low, a good release of the silicone antifoam in the early stages of the washing cycle can be achieved.

The foam control agent disclosed in EP-A-0.636.684 however presents the problem that its foam controlling properties deteriorate to some extent upon storing of the foam control agent in the detergent powder for prolonged periods of time, despite the presence of the encapsulating or protective material in combination with the carrier material. In particular, the foam controlling properties appear to deteriorate upon storing in the detergent powder in humid conditions.

There is thus a need to find an improved silicone based foam control agent, having a zeolite carrier, which is capable of better maintaining its foam controlling properties when stored for prolonged periods of time, even in humid conditions, while achieving a good release of the silicone antifoam in the early stages of the washing cycle.

We have now found that a foam control agent which comprises a polycarboxylate-type binder which has a pH value of 3 or less when dissolved in water, is capable of providing a better maintenance of the foam control properties upon storing, even upon storing under humid conditions. Thus, according to the present invention, a foam control agent with an improved storage stability can be obtained.

According to the invention there is provided a particulate foam control agent comprising from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate-type binder or encapsulant, whereby the polycarboxylate-type binder has a pH of 3 or less when dissolved in water.

The pH of the polycarboxylate-binder is the pH of a solution of 10% by weight of the polycarboxylate-binder in water, measured at 296K (23° C.).

The specified polycarboxylate-type binder for use in the present invention allows to obtain an improved encapsulation or protection of the antifoam, which is not adversely affected by a storing of the foam control agent for prolonged periods of time, even under humid conditions.

Surprisingly it has been found that with the specified polycarboxylate-type binder for use in the present invention a stronger interaction between the zeolite carrier material and the polycarboxylate binder can be achieved. The stronger interaction between the zeolite carrier material and the polycarboxylate binder appears to result in an increased bond strength or cohesion within the polycarboxylate binder layer, thus providing a better protection of the silicone antifoam. In that way, the ability of moisture to break and open the encapsulating or protecting binder layer, which would result in an undesired release of the silicone anti-foam from the foam control agent in a too early stage and absorption by or spreading of the silicone oil from the anti-foam over the detergent powder, can be significantly reduced. The improved encapsulation or protection has namely been found capable of showing an increased resistance towards moisture, thus preventing an undesired release of the antifoam when storing the foam control agent for a prolonged period of time, even in humid conditions as a result of the increased interaction between the zeolite carrier and the polycarboxylate-type binder. In that way a foam control agent can be obtained with an improved encapsulation of the antifoam control agent, which results in an increased storage stability of the foam control agent.

Surprisingly it has also been found that with the foam control agent of the present invention, absorption by and spreading of the silicone anti-foam over the detergent powder can be counteracted even in case of some leakage of the silicone anti-foam through the encapsulating or protecting polycarboxylate binder layer.

In the foam control agent of the present invention, as the binder or encapsulating material, use is made of certain polycarboxylate materials. Polycarboxylate materials have been described in the art, and have the advantage that, in the same way as zeolites, they are useful ingredients in detergent compositions.

Polycarboxylate materials are known as dispersing agents in detergent powders and are water soluble polymers, homopolymers, copolymers or salts thereof. They have at least 60% by weight of segments with the general formula

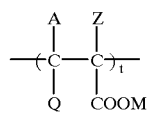

wherein A, Q and Z are each selected from the group consisting of hydrogen, methyl, carboxy, carboxymethyl, hydroxy and hydroxymethyl; M is hydrogen, alkali metal, ammonium or substituted ammonium and t is from 30 to 400. Preferably A is hydrogen or hydroxy, Q is hydrogen or carboxy, and Z is hydrogen. Suitable polymeric polycarboxylates include polymerised products of unsaturated monomeric acids, i.e. acrylic acid, maleic acid, maleic anhydride, fumaric acid, itaconic acid, aconitic acid, mesaconic acid, cetraconic acid and methylene malonic acid. The copolymerisation with lesser amounts of monomeric materials comprising no carboxylic acid, i.e. vinylmethyl, vinylmethylethers, styrene and ethylene, is not detrimental to the use of the polycarboxylates in the foam control agents of the present invention. Depending on the type of polycarboxylate this level can be kept low or levels can be up to about 40% by weight of the total polymer or copolymer.

Preferred polycarboxylates are those which have a molecular weight of no more than 9000. More preferred polycarboxylates have a molecular weight of between 1000 and 6000. It has namely been found that the efficiency of the protection or encapsulation by the polyacrylate-type binder varies with its molecular weight. Polycarboxylates with a molecular weight of no more than 9000 show an optimal mobility, so that an optimal encapsulation or protection can be achieved.

Particularly suitable polymeric polycarboxylates are the polyacrylates with an average viscosity at 23° C. in mPa.s from 50 to 10,000, preferably from 2,000 to 8,000. The most preferred polycarboxylate polymers are acrylate/maleate or acrylate/fumarate copolymers or their sodium salts. The ratio of acrylate to maleate or fumarate segments may vary from 30:1 to 2:1. Carboxylates may be supplied in powder or liquid form. They may be liquid at room temperature or may be supplied as aqueous solutions. The latter are preferred as they facilitate the manufacture of the foam control agents according of the present invention with conventional spray applications.

Polycarboxylates as such, and in particular polyacrylates, are mostly acidic and have a pH of about 1–1.5. Suitable examples of polycarboxylates for use in the foam control agent of this invention include acrylic homopolymers, for example Sokalan®PA80S and Sokalan®PA110S (BASF, Germany), which have a pH of approximately 1.5, acrylic-maleic copolymers, for example Sokalan®CP12S (BASF, Germany) which has a pH of approximately 1, and modified polyacrylic acid polymers, for example Sokalan®CP10S and 13S (also BASF, Germany) which have a pH of approximately 1.5. Other suitable polycarboxylates include Narlex (National Starch, GB) and Norasol (Norsohass, France).

Commercial polycarboxylates are often available in a partially neutralised form and have a pH of above 3. In that case, the polycarboxylate for use in the foam control agent of this invention is preferably a polycarboxylate which has been acidified to a pH of 3 or less, prior to the preparation of the foam control agent.

Preferred acids for acidifying the polycarboxylate-type binder are strong acids selected, from the group comprising hydrochloric acid, sulphuric acid and nitric acid. By making use of a strong acid, the amount of acid needed for achieving the desired acidification or pH of the polycarboxylate binder material, can be kept sufficiently low.

Acidification of the polycarboxylate material can be performed by thoroughly mixing an aqueous solution of the polycarboxylate material with the strong acid. The amount of acid used mostly varies from 2–5% by weight with respect to the amount of polycarboxylate in the solution.

Suitable examples of partially neutralised polycarboxylite binder materials include partially neutralised Sokalan®PN+ (BASF, Germany), for example, the sodium salt of a maleic acid/acrylic acid copolymer Sokalan®CP5 (pH≃8), Sokalane®CP45 (pH≃4), the sodium salt of a modified polyacrylic acid Sokalan®CP10 (pH≃8.5), PA 15 PN and PA30PN (pH≃7).

The surfactant used in the foam control agent of the present invention is preferably essentially free of silicone moieties, and is preferably an organic surfactant. Organic surfactants namely show a good chemical stability, even in conjunction with an acidified or acid type of polycarboxylate binder.

Preferably, the surfactant is a detergent-active material, as this will have the additional advantage of being an active ingredient in an aqueous surfactant solution into which the foam control agent will be used, i.e. a powder detergent composition. It is preferred that the organic surfactant is soluble or dispersible in an aqueous surfactant solution. More preferably, the surfactant is a water soluble or water dispersible surfactant. Suitable surfactants have been described in a number of publications and are generally well known in the art. Suitable organic surfactants are for example described in EP-A- 0.718.018, which is hereby incorporated by reference. It is preferred that the organic surfactant is a good emulsifier, especially for the siloxane materials that are used for making the silicone antifoam.

Silicone antifoams for use in the foam control agents of this invention are known materials and have been described in a number of patent specifications, including those referred to herein. Silicone antifoams are preferably foam regulating compositions comprising a liquid organopolysiloxane polymer and a filler particle the surface of which has been rendered hydrophobic.

Liquid organopolysiloxane polymers that are useful in silicone antifoams are also known and have been described in many patent specifications. Full description of all options is therefore not included but can be found in the many publications including patent application EP-A-578 424. Preferably they are linear or branched polymers having a structure according to the general formula (I)

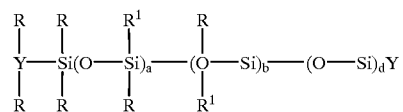

In formula (I), R denotes a monovalent hydrocarbon group having from 1 to 8 carbon atoms, preferably from 1 to 4 carbon atoms, $R^1$ denotes a group R, a hydroxyl group, or a group

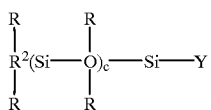

wherein $R^2$ denotes a divalent hydrocarbon, hydrocarbonoxy or siloxane group or oxygen; $R^3$ denotes a $C_{9-35}$ alkyl group; Y denotes a group R or a hydroxyl group; a, b, c and d have a value of 0 or an integer, provided at least one of a and b is an integer, and the total of a+b+c+d has a value such that the viscosity of the organopolysiloxane polymer at 25° C. is at least 50 mm$^2$/s. The organopolysiloxane polymers may be linear, in which case $R^1$ denotes R or a hydroxyl group. It is preferred for the linear organopolysilixanes that Y denotes a group R and that b=0. More preferred are those linear polymers wherein d=0 and wherein at least 80% of all R groups denote an alkyl group having from 1 to 4 carbon atoms, most preferably methyl. It is most preferred that the linear organo-polysiloxanes are trimethylsiloxane end-blocked polydimethylsiloxanes. The preferred viscosity of the linear organopolysiloxanes is from 500 to 100,000 mm$^2$/s, more preferably 1000 to 60,000 mm$^2$/s at 25° C.

Organopolysiloxanes that are not linear are also known in the art. The preferred non-linear materials are those having branching in the siloxane chain. These polymers have a structure according to Formula (I), wherein b has a value of at least 1 and $R^2$ is preferably a divalent siloxane group or an oxygen atom. Particularly preferred siloxane groups $R^2$ are small three dimensional siloxane resin particles that may have a number of pending siloxane polymer units. Branched siloxanes are known and examples of them have been described, together with a method of making them, in a number of patent specifications, i.e. GB 639 673, EP 31 532, EP 217 501, EP 273 448, DE 38 05 661 and GB 2 257 709. Preferred liquid organopolysiloxanes are branched or higher viscosity siloxanes (e.g. having a viscosity above 12,500 mm$^2$/s at 25° C.), especially branched siloxanes, as they show an improved ability to control foam in most aqueous surfactant solutions.

Filler particles that are useful in the antifoams for use in foam control agents according to the present invention are also well known and have been described in many publications. They are finely divided particulate materials examples of which include silica, fumed $TiO_2$, $Al_2O_3$, zinc oxide, magnesium oxide, salts of aliphatic carboxylic acids, reaction products of isocyanates with certain materials, i.e. cyclohexylamine, alkyl amides, for example ethylene or methylene bis stearamide. Most preferred are silica particles with a surface area as measured by BET measurement of at least 50 m$^2$/g. Suitable silica particles may be made according to any of the standard manufacturing techniques for example thermal decomposition of a silicon halide, decomposition and precipitation of a metal salt of silicic acid, i.e. sodium silicate and a gel formation method. Suitable silicas for use in the antifoams include therefore fumed silica, precipitated silica and gel formation silica. The average particle size of these fillers may range from 0.1 to 20 μm, but is preferably form 0.5 to 2.5 μm.

Where the filler particles are not hydrophobic by themselves, their surface is rendered hydrophobic at least to some extent in order to make the antifoam sufficiently effective in aqueous systems. Rendering the filler particles hydrophobic may be done prior to, or after, dispersing the filler particles in the liquid organopolysiloxane. This can be effected by treatment of the filler particles with treating agents, i.e. reactive silanes or siloxanes, for example dimethyldichlorosilane, trimethylchlorosilane, hexamethyldisilazane, hydroxyl end-blocked and methyl end-blocked polydimethylsiloxanes, siloxane resins or a mixture of one or more of these. Fillers that have already been treated with such compounds are commercially available from many companies, for example Sipernat®, D10 from Degussa. The surface of the filler may alternatively be rendered hydrophobic in situ, e.g. after the filler has been dispersed in the liquid organopolysiloxane component. This may be effected by adding to the liquid organopolysiloxane prior to, during or after the dispersion of the filler therein the appropriate amount of treating agent of the kind described above, and heating the mixture to a temperature above 40° C. The quantity of treating agent to be employed will depend, for example, on the nature of the agent and the filler and will be evident or ascertainable by those skilled in the art. Sufficient should be employed to endow the filler with at least a discernible degree of hydrophobicity. The filler particles are added to the organopolysiloxane in an amount of from 1 to 25% by weight of the antifoam, preferably from 2 to 15%, most preferably from 3 to 8%.

The zeolite that may be used in the foam control agents according to the present invention may be any of those aluminosilicate materials that are known to be beneficial in detergent powder compositions and have been described in a number of patent specifications. Zeolites are used in detergent compositions as cation exchange components. Suitable zeolite materials include particularly those which are known as zeolite A and have an average formula $(Na_2O)_m \cdot Al_2O_3 \cdot (SiO_2)_n \cdot (H_2O)_t$, wherein m has a value of from 0.9 to 1.3, n has a value of from 1.3 to 4.0 and t has a value of from 1 to 6. Such zeolites are known ingredients in detergent powder compositions. Suitable zeolites may be crystalline or amorphous aluminosilicates and have been described in particular in EP 192 442 and EP 329 842 and in the patent specifications that are referred to on page 2 of the latter specification. The zeolites are mostly used in an amount of from 70 to 99 parts by weight of the foam control composition for every 1 to 30 parts of the silicone antifoam. Preferably the zeolites comprise about 70 to 99% by weight of the total weight of the components mentioned as forming part of the foam control agent, e.g. the silicone antifoam, the zeolite and the organopolysiloxane polyoxyalkylene copolymer, more preferably 75 to 90%. Suitable zeolites may be pre-treated with e.g. non-ionic surfactants, but are preferably untreated zeolites, as they seem to provide a better stability of the foam control agent when stored in a powder detergent composition.

The present invention also relates to a detergent composition in powder form which comprises 100 parts by weight of a detergent component and sufficient of a foam control agent according to the first aspect of the invention to give 0.05 to 5 parts by weight of the silicone antifoam comprised in the foam control agent.

Suitable detergent components are well known in the art and have been described in numerous publications. The components comprise an active detergent, organic and/or inorganic builder salts and other additives and diluents. The active detergent may comprise organic detergent surfactants of the anionic, cationic, non-ionic or amphoteric type, or mixtures thereof. Suitable anionic organic detergent surfactants include alkali metal soaps of higher fatty acids, alkyl aryl sulphonates for example sodium dodecyl benzene sulphonate, long chain (fatty) alcohol sulphates, olefin sulphates and sulphonates, sulphated monoglycerides, sulphated esters, sulphosuccinates, alkane sulphonates, phosphate esters, alkyl isothionates, sucrose esters and fluorosurfactants. Suitable cationic organic detergent surfactants include alkylamine salts, quaternary ammonium salts, sulphonioum salts and phosphonium salts. Suitable nonionic detergent surfactants include condensates of ethylene oxide with a long chain (fatty) alcohol or (fatty) acid, for example $C_{14-15}$ alcohol condensed with 7 moles of ethylene oxide (Dobanol® 45-7), condensates of ethylene oxide with an amine or amide, condensation products of ethylene and propylene oxides, fatty acid alkylol amide and fatty amine oxides. Suitable amphoteric organic detergent surfactants include imidazoline compounds, alkylaminoacid salts and betaines. Examples of inorganic components are phosphates, polyphosphates, silicates, carbonates, sulphates, oxygen releasing compounds such as sodium perborate and other bleaching agents and aluminosilicates, e.g. zeolites. Examples of organic components are anti-redeposition agents such as carboxymethylcellulose (CMC), brighteners, chelating agents, such as ethylene diamine tetra-acetic acid (EDTA) and nitrilotriacetic acid (NTA), enzymes and bacteriostats. Other optional components include colorants, dyes, perfumes, softeners, clays, some of which may be encapsulated. Materials suitable for the detergent component are well known to the person skilled in the art and are described in many text books as well as other publications.

The present invention also relates to a method for the preparation of a foam control agent which comprises depositing from 1 to 30 parts by weight of a silicone antifoam, on from 70 to 99 parts by weight of a zeolite carrier, together with or after from 1 to 60% by weight of the silicone antifoam of a surface active agent and from 1 to 40 parts by weight of a polycarboxylate-type binder or encapsulant, which has a pH value of 3 or less when dissolved in water have been deposited on the zeolite carrier.

In the method of the invention it is important that the both the polycarboxylate binder and the organopolysiloxane polyoxyalkylene copolymer surfactant are deposited onto the zeolite not later than the silicone antifoam. If this condition is not fulfilled, the storage stability of the foam control agent will not be as good. An even more preferred method is where a mixture of the three components (silicone antifoam, organopolysiloxane polyoxyalkylene copolymer and binder or encapsulant) is made according to any of the known methods, and this mixture deposited onto the zeolite surface. The premix can be made by simply mixing the ingredients, preferably with reasonable shear or high shear. Where one or more ingredients are solid or waxy materials, or materials of high viscosity, it may be beneficial to heat the mixture to melt or reduce the working viscosity of the mix. Alternatively the premix of the components may be diluted with a solvent, e.g. a low viscosity siloxane polymer, cyclic siloxane polymer, organic solvent or even by making a dispersion in water.

Depositing the mix onto zeolites can be done in a number of ways. Conventional procedures of making powders are particularly useful for making the particulate foam control agent. These include depositing of a previously prepared mixture of all of the two or three components onto the zeolite which is the most preferred method. It is however important that the silicone antifoam is not deposited prior to the organopolysiloxane polyoxyalkylene copolymer and the polycarboxylate binder. This is important if a mixture of only two ingredients out of three is deposited separately from the third ingredient. For example the organopolysiloxane polyoxyalkylene copolymer may be deposited first, followed by deposition of a mixture of the silicone antifoam and the binder or encapsulant. In contrast to what has been found in EP-A-0.636.684, it has been found to be beneficial to make a mixture of the organopolysiloxane polyoxyalkylene copolymer with the binder or encapsulant and to deposit this prior to the deposition of the silicone antifoam, or to make a mixture of the three components and deposit them all together. One particularly useful way of depositing the components onto the zeolite is by spraying one or more of these onto the zeolite, which may be present in a drum mixer, fluidised bed etc. This may be done at room temperature or at elevated temperature, which is particularly useful if one wants to evaporate some or all of the solvent during the process. In one process the zeolite powder is mixed with the premix of all the other components, e.g. in a high shear mixer, e.g. Eirich® pan granulator, Schugi® mixer, Paxeson-Kelly® twin-core blender, Loedige® ploughshare mixer, Aeromatic® fluidised bed granulator or Pharma® type drum mixer. The deposition may be done by pouring the mixture into the mixer, as well as spraying, as is described above.

The process of the invention uses from 1 to 30 parts by weight of silicone antifoam and from 70 to 99 parts by weight of zeolite. If a lower amount of silicone antifoam were to be used this would make the foam control agent less effective as the silicone antifoam would be too thinly distributed on the carrier material. Higher amounts than 30 parts of silicone antifoam are possible in theory, but are not practical, as this would render the dispersion of the foam control agent in the powder detergent more difficult and one could not be sure that each measure of powder detergent would incorporate the correct amount of silicone antifoam. Higher levels would also possibly result in a more tacky material which would not be granulated very easily.

Thus use of 1 to 60% of organopolysiloxane polyoxyalkylene copolymer by weight based on the weight of the silicone antifoam is chosen for efficiency reasons as well as to minimise the amount of material which is to be introduced in the powder detergent which is not per se beneficial to the cleaning efficiency of the detergent composition. For the first more preferred copolymer, as defined above, it is more preferred to use 5 to 60% by weight, especially 5 to 35% by weight, based on the weight of the silicone antifoam. For the second more preferred copolymer as defined above, it is more preferred to use 1 to 35% by weight based on the weight of the silicone antifoam. Most preferably the amount of copolymer used is from 1 to 20% of the silicone antifoam, for the first more preferred copolymer, especially 10 to 20% by weight.

The amount of polycarboxylate is to be used in an amount of from 1 to 40 parts by weight, preferably the amount of binder or encapsulating material is used in amounts of from 10 to 30 parts, most preferably 15 to 25 parts by weight.

The invention is further illustrated in the following examples. All parts and percentages are given by weight unless otherwise indicated.

EXAMPLE 1

Preparation of the Foam Control Agent

A foam control agent was prepared by mixing approximately 75 parts of a zeolite Wessalith® P, a zeolite manufactured by Degussa, with approximately 10.1 parts of a Sokalan® CP12 S polycarboxylate copolymer binder material provided by BASF, which has a pH of 1 when dissolved in water and a molecular weight of about 26,000, approximately 12 parts of a silicone antifoam, comprising a branched polymethylsiloxane polymer and 5% hydrophobic silica having been prepared according to the teaching of EP 217 501 and approximately 1.5 parts of an organopolysiloxane polyoxyalkylene copolymer with about 10% of the siloxane units having a pending polyoxyalkylene group, having about 20 units of each oxyethylene and oxypropylene groups.

The mixture was prepared by pure mechanically mixing the antifoam, the surfactant and copolymer together and pouring the mixture very slowly into a drum mixer in which the zeolite was placed. The mixture was stirred continuously until a particulate material was obtained.

EXAMPLE 2

A foam control agent was prepared as described in Example 1, except that as a binder material, approximately 15.65 parts of a Sokalan® CP10S polycarboxylate copolymer binder material provided by BASF, which has a pH of 1.5 was used, and approximately 11.3 parts of a silicone antifoam.

EXAMPLE 3

A foam control agent was prepared as described in Example 1, except that as the polycarboxylate material approximately 10.2 parts of a Sokalan® PA15PN polycarboxylate copolymer binder material provided by BASF, which has a pH of 1.5 was used, and approximately 9 parts of the silicone antifoam.

EXAMPLE 4

A foam control agent was prepared as described in Example 1, except that as the polycarboxylate material approximately 10.1 parts is used of Sokalan CP5 which has been acidified with respectively 2%, 3% and 5% of concentrated sulphuric acid based on the weight of the polycarboxylate.

Preparation of the Powder Detergent Composition

A powder detergent composition was received from a customer and comprises 5% non-ionic surfactant and 5 to 10% anionic surfactants. Several Powder Detergent Compositions were prepared by adding a sufficient amount of the foam control agent of Examples 1, 2, 3 and 4 to 100 g of the detergent composition, to give 0.20 g of the silicone antifoam in each lot.

Ageing of the Powder Detergent Compositions

The antifoam samples of Example 1, 2, 3 and 4 have been submitted to ageing conditions in the above described commercial detergent powder for 4 weeks, at a temperature of 35° C., and 70% relative humidity, which corresponds approximately to a storage of one year at room temperature.

Testing of the Release in the Washing Cycle

A conventional automatic front-loading washing machine having a transparent loading door, was loaded with 3.5 kg of clean cotton fabric. A wash cycle was carried out at 95° C. with each of the Lots prepared as described above, both before and after ageing. The door of the washing machine was divided in its height by a scale from 0 to 100, with regular intervals. The foam height during the wash cycle was recorded for each of the samples with and without ageing, when the rotation of the drum of the washing machine was stationary. In Example 1 and 2 a wash cycle of 60 minutes was used (Table 1), in Example 3 and 4 (Table 2), a wash cycle of 30 minutes was used. Higher values indicate a higher foam level in the machine and thus worse performance of the foam control agent.

COMPARATIVE EXAMPLE A

A foam control agent was prepared as described in Example 1, except that as a binder material, approximately 11.4 parts by weight of a Sokalan®CP5 was used, which has a pH of approximately 8. The foam control agent was subjected to the ageing conditions as described above for examples 1–4.

COMPARATIVE EXAMPLE B

A foam control agent was prepared as described in Example 1, except that as a binder material, approximately 11.4 parts by weight of a Sokalan®CP45 was used, which has a pH of approximately 4. The foam control agent was subjected to the ageing conditions as described above for examples 1–4.

Preparation of the Powder Detergent Composition

A powder detergent composition was prepared with the foam control agents of comparative example A and B, as described above for Examples 1–4.

Testing of the Release in the Washing Cycle

The testing of the release in the washing cycle was performed as described above for Examples 1–4. In Comparative Example A, a wash cycle of 60 minutes was used (Table 1), in Comparative Example B (Table 2), a wash cycle of 30 minutes was used.

Results

From the Comparative Examples A and B, in Table 1 and 2, it can be seen that the amount of foam produced during a washing cycle increases, and that the foam control properties of the foam control agent deteriorate upon ageing of the detergent powder, when use is made of a polycarboxylate binder which has a pH of respectively 8 and 4.

When use is made of a foam control agent which comprises a polycarboxylate binder which has a pH of below 3 when dissolved in water, for example a pH of 1 (Example 1), 1.5 (Example 2 and 3), the foam control properties of the foam control agent can be maintained. By making use of a polycarboxylate binder which has a pH of below 3 when dissolved in water, or which has been acidified to a pH of below 3, an improved encapsulation of the antifoam can be obtained, thus counteracting an undesired release of the antifoam from the foam control agent upon storing and/or ageing in the detergent powder. With the polycarboxylate binder material of the present invention, a good release of the foam control agent in the early stages of the washing cycle, can be achieved, even after ageing of the foam control agent in the detergent powder.

TABLE 1

Foam level as a function of time (minutes) before and after ageing

| Time | 0 | 5 | 10 | 15 | 20 | 25 | 30 | 35 | 40 | 45 | 50 | 55 | 60 |
| --- | --- | --- | --- | --- | --- | --- | --- | --- | --- | --- | --- | --- | --- |
| Ex.1-pH = 1 | | | | | | | | | | | | | |
| before ageing | 0 | 55 | 65 | 50 | 45 | 40 | 25 | 25 | 25 | 25 | 25 | 30 | 30 |
| after ageing | 0 | 2.5 | 17.5 | 32.5 | 45 | 50 | 50 | 50 | 42.5 | 27.5 | 32.5 | 35 | 35 |

TABLE 1-continued

Foam level as a function of time (minutes) before and after ageing

| Time | 0 | 5 | 10 | 15 | 20 | 25 | 30 | 35 | 40 | 45 | 50 | 55 | 60 |
|---|---|---|---|---|---|---|---|---|---|---|---|---|---|
| Ex.2-pH = 1.5 | | | | | | | | | | | | | |
| before ageing | 0 | 20 | 40 | 60 | 50 | 50 | 40 | 50 | 60 | 60 | 60 | 60 | 60 |
| after ageing | 0 | 10 | 50 | 60 | 60 | 50 | 60 | 60 | 50 | 40 | 50 | 50 | 50 |
| Comparative Ex. A | | | | | | | | | | | | | |
| before ageing | 0 | 0 | 0 | 0 | 0 | 5 | 15 | 20 | 25 | 30 | 40 | 50 | 50 |
| after ageing | 0 | 67.5 | 100 | 100 | 100 | 100 | 100 | 102.5 | 107.5 | 107.5 | 107.5 | 107.5 | 107.5 |

TABLE 2

Foam level (%) as a function of time (minutes) before and after ageing

| Time | 0 | 4 | 6 | 8 | 10 | 12 | 14 | 16 | 18 | 20 | 22 | 24 | 26 | 28 | 30 |
|---|---|---|---|---|---|---|---|---|---|---|---|---|---|---|---|
| Comparative Ex. B pH = 8 | | | | | | | | | | | | | | | |
| before ageing | 0 | 20 | 20 | 40 | 40 | 50 | 50 | 60 | 70 | 80 | 100 | 60 | 60 | 70 | 80 |
| after ageing | 0 | 100 | 100 | 100 | 100 | 100 | 100 | 100 | 100 | 100 | 100 | 100 | 100 | 100 | 100 |
| Ex.4 2% $H_2SO_4$ | | | | | | | | | | | | | | | |
| before ageing | 0 | 10 | 20 | 30 | 40 | 50 | 60 | 50 | 40 | 40 | 40 | 40 | 50 | 60 | 60 |
| after ageing | 0 | 30 | 30 | 40 | 40 | 50 | 50 | 40 | 40 | 40 | 30 | 40 | 40 | 40 | 50 |
| Ex.4 3% $H_2SO_4$ | | | | | | | | | | | | | | | |
| before ageing | 0 | 10 | 20 | 30 | 40 | 50 | 60 | 50 | 40 | 40 | 40 | 40 | 50 | 60 | 60 |
| after ageing | 0 | 20 | 30 | 40 | 50 | 50 | 60 | 60 | 40 | 40 | 40 | 40 | 40 | 40 | 50 |
| Ex.4 5% $H_2SO_4$ | | | | | | | | | | | | | | | |
| before ageing | 0 | 10 | 20 | 30 | 40 | 40 | 40 | 50 | 50 | 40 | 50 | 30 | 30 | 30 | 40 |
| after ageing | 0 | 30 | 40 | 40 | 50 | 60 | 60 | 40 | 40 | 40 | 40 | 40 | 40 | 40 | 40 |
| Ex.3 pH = 1.5 | | | | | | | | | | | | | | | |
| before ageing | 0 | 10 | 25 | 35 | 40 | 45 | 50 | 50 | 55 | 60 | 60 | 60 | 50 | 40 | 40 |
| after ageing | 0 | 30 | 45 | 50 | 52.5 | 52.5 | 55 | 55 | 50 | 52.5 | 47.5 | 45 | 45 | 45 | 45 |

That which is claimed is:

1. A particulate foam control agent comprising from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate binder or encapsulant, which has a pH of 3 or less, when dissolved in water.

2. A particulate foam control agent as claimed in claim 1, wherein the polycarboxylate binder has a molecular weight of no more than 9000.

3. A particulate foam control agent as claimed in claim 1, wherein the polycarboxylate binder has a molecular weight of between 1000 and 6000.

4. A particulate foam control agent as claimed in claim 1, wherein the polycarboxylate binder has been acidified to a pH of 3 or less, prior to the preparation of the foam control agent.

5. A particulate foam control agent as claimed in claim 1, wherein the polycarboxylate binder has been acidified by means of a strong acid, selected from the group of hydrochloric acid, sulphuric acid and nitric acid.

6. A particulate foam control agent as claimed in claim 1, wherein the surface active agent is essentially free of silicone moieties.

7. A particulate foam control agent as claimed in claim 1, wherein both the surface active agent and the polycarboxylate binder have been deposited on the zeolite not later than the silicone antifoam.

8. A detergent composition in powder form comprising 100 parts by weight of a detergent component and a sufficient amount of a particulate foam control agent comprising from 1 to 30 parts by weight of a silicone antifoam, from 70 to 99 parts by weight of a zeolite carrier for the antifoam, from 1 to 60% by weight of the silicone antifoam of a surface active agent which has been deposited on the zeolite carrier not later than the silicone antifoam and from 1 to 40 parts by weight of a polycarboxylate binder or encapsulant, which has a pH of 3 or less, when dissolved in water, to give 0.05 to 5 parts by weight of the silicone antifoam comprised in the foam control agent.

9. A method for the preparation of a foam control agent which comprises depositing from 1 to 30 parts by weight of a silicone antifoam on 70 to 99 parts by weight of a zeolite carrier, said silicone antifoam being deposited together with the deposition of 1 to 60% by weight of the silicone antifoam of a surface active agent and 1 to 40 parts by weight of a polycarboxylate binder or encapsulant, which has a pH value of 3 or less when dissolved in water.

10. A method for the preparation of a foam control agent which comprises depositing from 1 to 30 parts by weight of a silicone antifoam on 70 to 99 parts by weight of a zeolite carrier, said silicone antifoam being deposited after 1 to 60% by weight of the silicone antifoam of a surface active agent and 1 to 40 parts by weight of a polycarboxylate binder or encapsulant, which has a pH value of 3 or less when dissolved in water have been deposited onto the zeolite.

11. A method as claimed in claim 10, wherein the polycarboxylate binder has been acidified to a pH of 3 or less or before it is deposited on the zeolite material.

* * * * *